(12) United States Patent
Karow et al.

(10) Patent No.: US 6,624,814 B1
(45) Date of Patent: Sep. 23, 2003

(54) OPTICAL JUSTIFICATION OF TEXT

(75) Inventors: Peter Karow, Hamburg (DE); John R. MacMillan, Portola Valley, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/187,912

(22) Filed: Nov. 6, 1998

Related U.S. Application Data

(62) Division of application No. 08/686,212, filed on Jul. 23, 1996, now Pat. No. 5,937,420.

(51) Int. Cl.⁷ .............................................. G06T 11/00
(52) U.S. Cl. ...................................................... 345/467
(58) Field of Search ................................. 345/471, 472, 345/467, 468, 469; 707/518, 519

(56) References Cited

U.S. PATENT DOCUMENTS

| | | | | |
|---|---|---|---|---|
| 3,712,443 A | * | 1/1973 | Mathews ................... | 197/84 A |
| 4,027,313 A | * | 5/1977 | Klepper et al. ............... | 354/15 |
| 4,591,999 A | | 5/1986 | Logan ......................... | 364/523 |
| 4,783,760 A | * | 11/1988 | Carosso ....................... | 364/900 |
| 4,833,627 A | | 5/1989 | Leszczynxki ............... | 364/523 |
| 4,933,866 A | | 6/1990 | Markoff et al. ............. | 364/518 |
| 5,150,460 A | | 9/1992 | Onodera et al. ............ | 395/151 |
| 5,257,351 A | * | 10/1993 | Leonard et al. ............. | 395/150 |
| 5,289,170 A | * | 2/1994 | Fujii ............................ | 345/144 |
| 5,319,358 A | | 6/1994 | Martinez et al. ............ | 345/141 |
| 5,399,029 A | | 3/1995 | Muraoka et al. ............... | 400/9 |
| 5,416,898 A | * | 5/1995 | Opstad et al. .............. | 395/150 |
| 5,432,890 A | | 7/1995 | Watanabe .................... | 395/100 |
| 5,501,538 A | | 3/1996 | Sawada et al. ............. | 400/304 |
| 5,598,520 A | | 1/1997 | Harel et al. .................. | 395/169 |
| 5,623,593 A | | 4/1997 | Spells, III .................... | 395/172 |
| 5,724,596 A | * | 3/1998 | Lathrop ....................... | 395/781 |
| 5,803,629 A | * | 9/1998 | Neville et al. .............. | 400/304 |
| 5,825,999 A | * | 10/1998 | Uzaki et al. ................. | 395/167 |
| 5,883,637 A | * | 3/1999 | Nakayama et al. ......... | 345/467 |
| 5,937,420 A | * | 8/1999 | Karow et al. ................ | 707/518 |

FOREIGN PATENT DOCUMENTS

EP    0 465 704 B1    1/1995

OTHER PUBLICATIONS

Boag A., 1994, "Fonts: a survey of current issues," Desktop Publishing Commentary, vol. 10, No. 2, ISSN 0957–3178, UK, pp. 6–9.

Haralambous, Y. Sep., 1993, "Parametrization of PostScript fonts through METAFONT—an alternative to Adobe Multiple Master Fonts," Third Internation Conference on Raster Imaging and Digital Typography, RIDT '94, Darmstadt, Germany, Apr. 11–13, 1994, vol. 6, No. 3. ISSN 0894–3982, UK, pp. 145–157.

Karow, Peter, Digital Typefaces, Springer Verlag, 1994, ISBN 3–540–56509–4, pp. 139–184.

Karow, Peter, Font Technology, Springer Verlag, 1994, ISBN 3–540–57223, pp. 173–192.

McQueen, C.D., III et al., Apr. 1994, "Infinifont: A parametric font generation system," Third International Conference on Raster Imaging and Digital Typography, RIDT '94, Darmstadt, Germany, Apr. 11–13, 1994, vol. 6,No. 3, ISSN 0894–3982, UK, pp. 117–132.

(List continued on next page.)

*Primary Examiner*—Vijay Shankar
(74) *Attorney, Agent, or Firm*—Fish & Richardson P.C.

(57) ABSTRACT

Method and apparatus for justifying text rendered from a digital font at an output pointsize. The invention includes using a kerning value for a character pair including a space character and a nonspace character to place the nonspace character at a margin. The invention can be used in conjunction with a font having first kerning metrics for a small pointsize and for a different large pointsize. The kerning value can be obtained by interpolating the small pointsize metrics and the large pointsize metrics.

14 Claims, 7 Drawing Sheets

Television-
HHOOAVV

6 PT SPACING
72 PT PRINTING

Television-
HHOOAVV

12 PT SPACING
72 PT PRINTING

Television-
HHOOAVV

72 PT SPACING
72 PT PRINTING

OTHER PUBLICATIONS

URW Software & Type GmbH, "Micro–typography for advanced typesetting," hz–program, 1993, pp. 15–25.

URW Software and Type GmbH, "Kernus," 1993, pp. 1–20.

Apple Computer, QuickDraw GX Font Formats, 1995—pages printed from Apple WWW Site.

Apple Computer, About QuickDraw GX Fonts, 1995—pages printed from Apple WWW Site.

Apple Computer, Optical Bounds Table, 1995—pages printed from Apple WWW Site.

Apple Computer, Kerning Table, 1995—pages printed from Apple WWW Site.

Fenton, E., "Inside QuickDraw GX Fonts", Macworld, 1994—pp. 122–126.

* cited by examiner

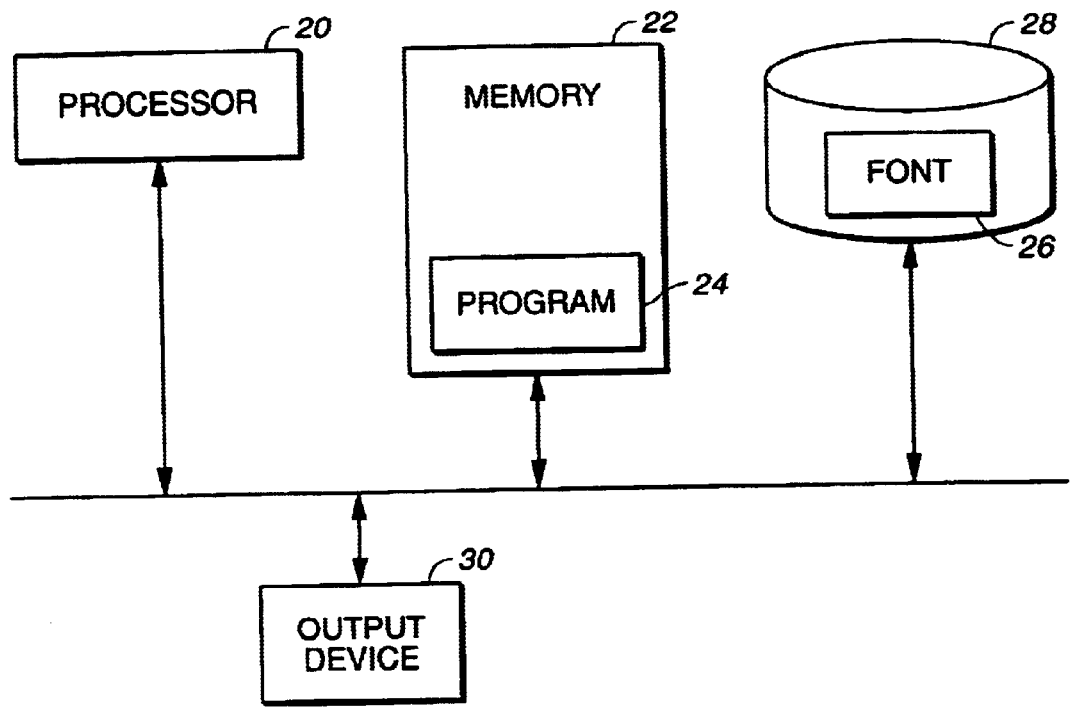
FIG._1
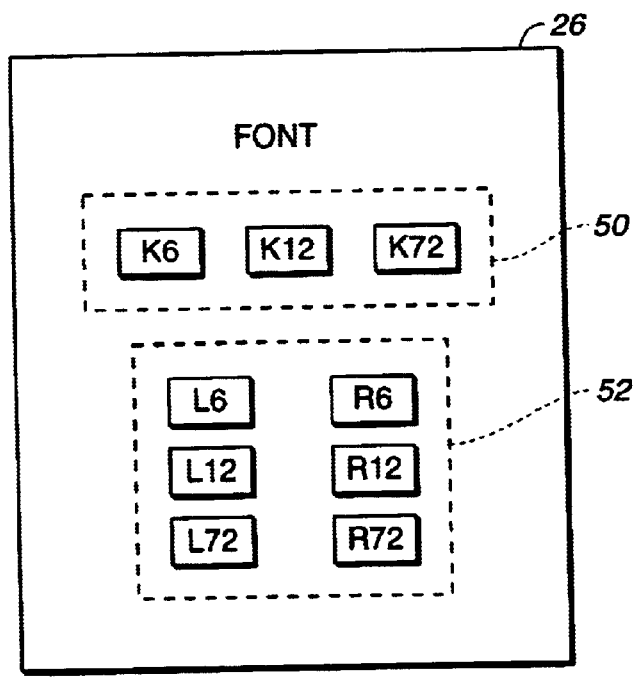
FIG._6

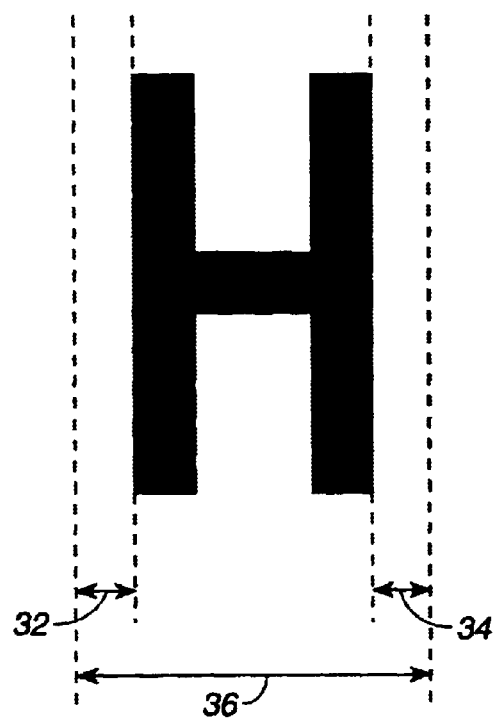
FIG._2
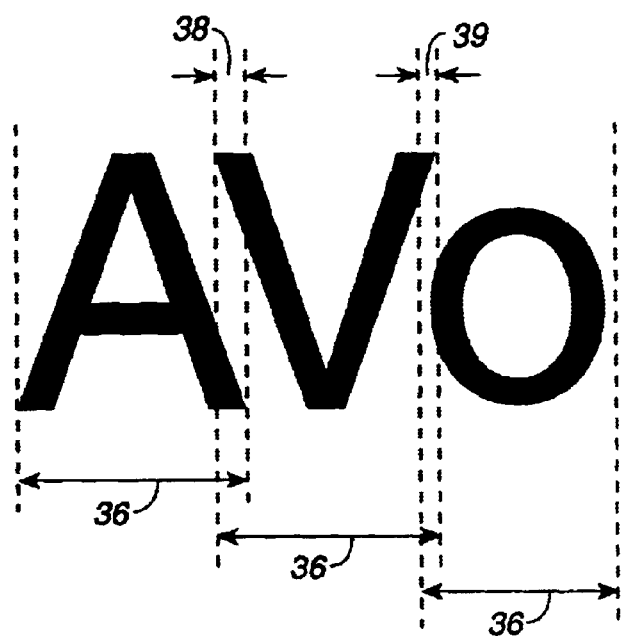
FIG._3

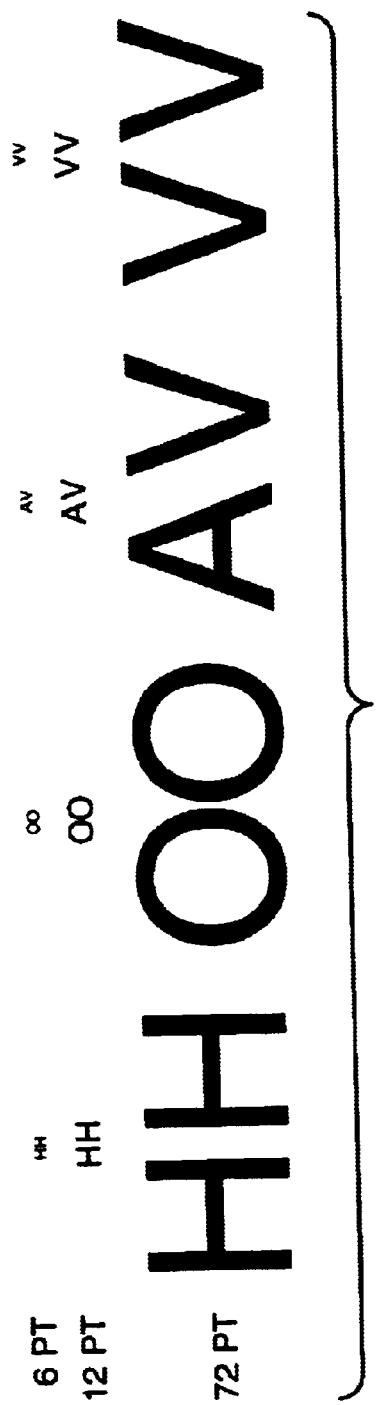
FIG._4A
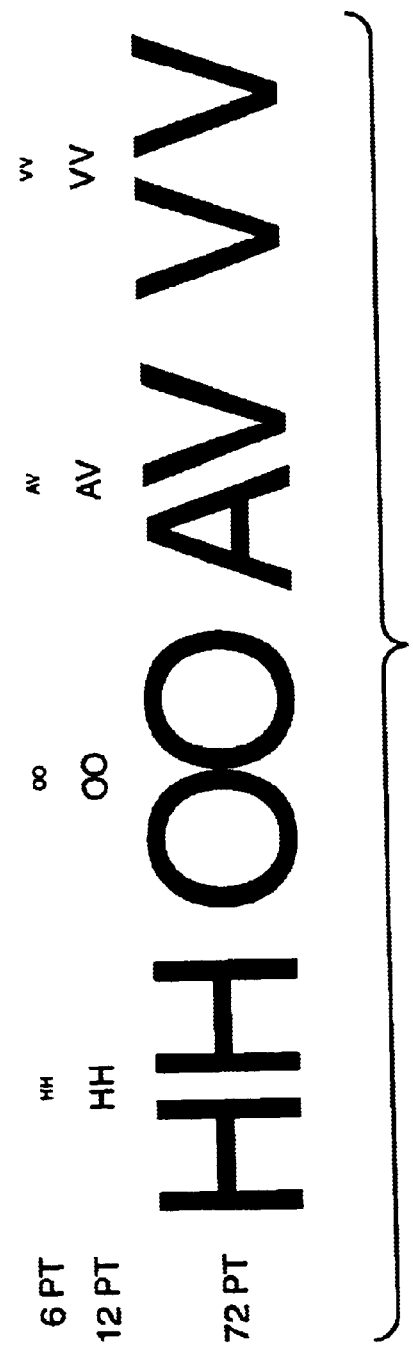
FIG._4B

6 PT SPACING
72 PT PRINTING

Television-
HHOOAVV

12 PT SPACING
72 PT PRINTING

Television-
HHOOAVV

72 PT SPACING
72 PT PRINTING

Television-
HHOOAVV

*FIG._5A*

6 PT SPACING
72 PT PRINTING

Television-
HHOOAVV

12 PT SPACING
72 PT PRINTING

Television-
HHOOAVV

72 PT SPACING
72 PT PRINTING

Television-
HHOOAVV

*FIG._5B*

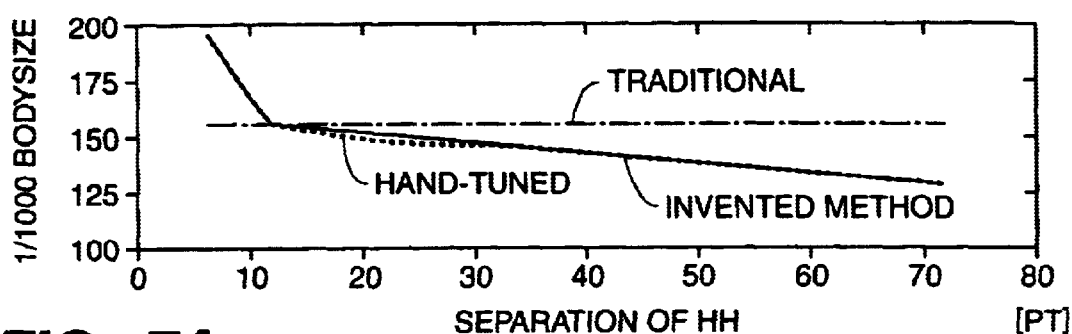
FIG._7A
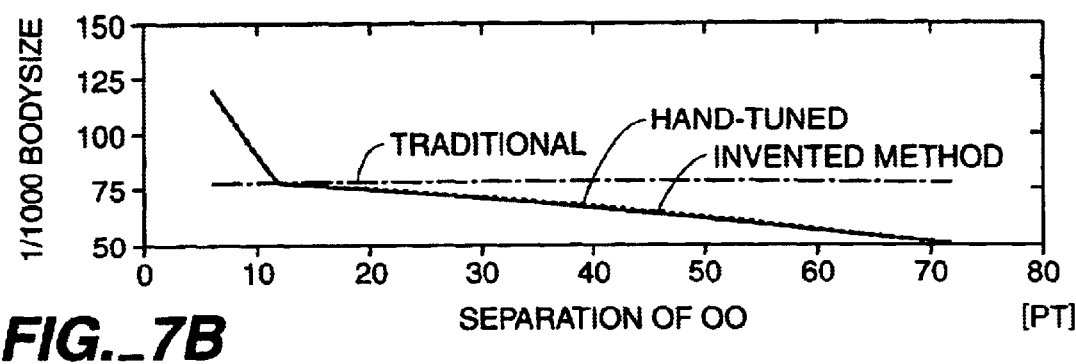
FIG._7B
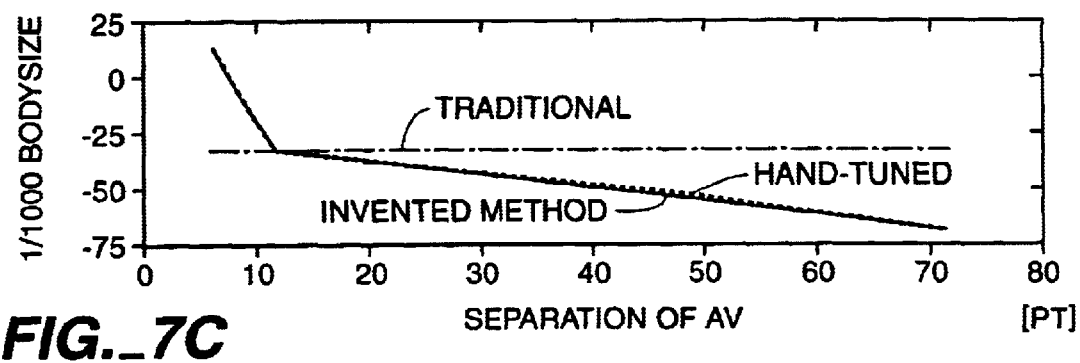
FIG._7C
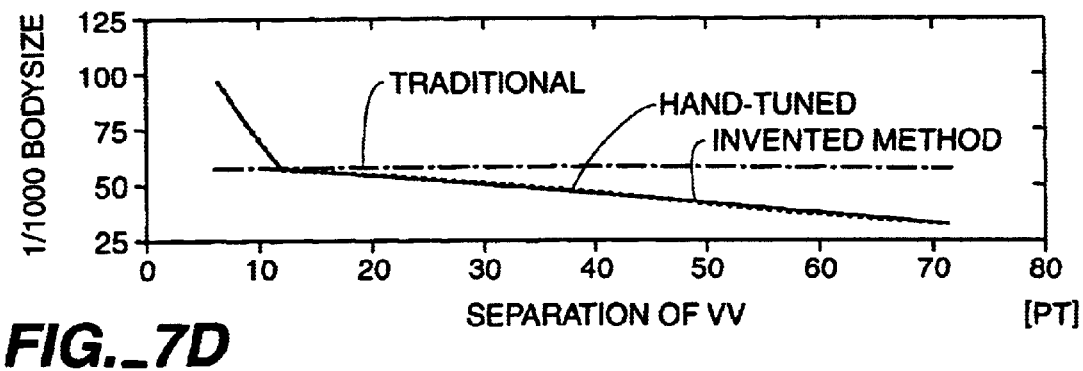
FIG._7D

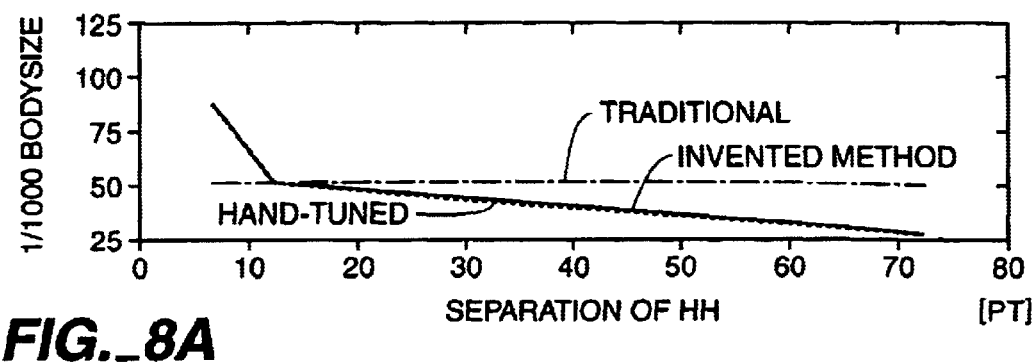
*FIG._8A*
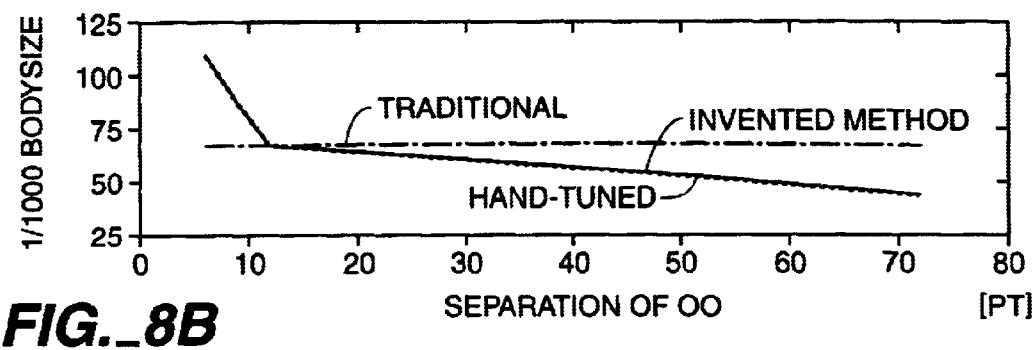
*FIG._8B*
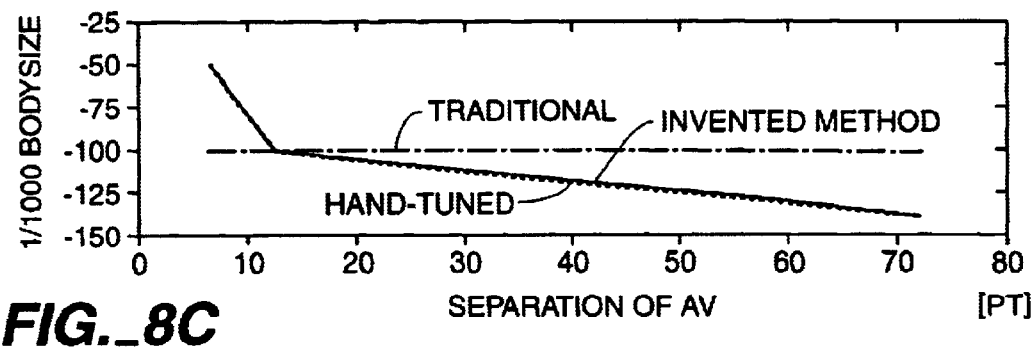
*FIG._8C*
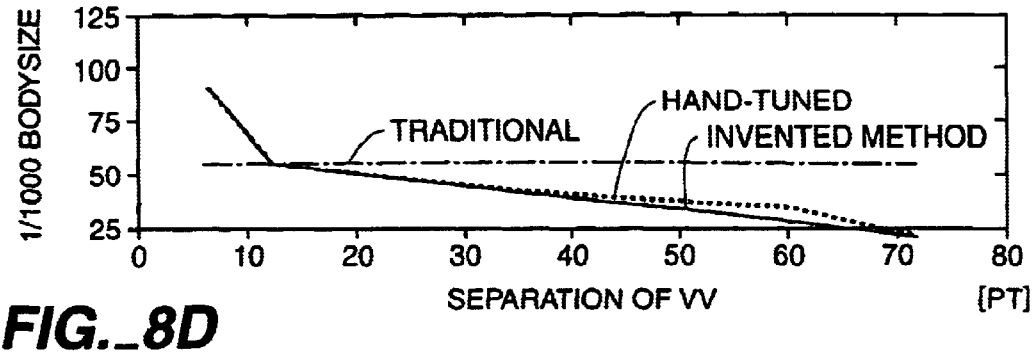
*FIG._8D*

OPTICAL JUSTIFICATION OF TEXT

CROSS REFERENCE TO RELATED APPLICATION

This is a divisional of pending U.S. application Ser. No. 08/686,212, filed Jul. 23, 1996, which is incorporated herein by reference.

BACKGROUND OF THE INVENTION

This invention relates to the generation of the spacing of characters for output to devices such as display screens, laser printers, photo typesetters and laser film recorders at a range of pointsizes.

A set of characters with a particular design is called a "typeface". A digital font (referred to here simply as a "font"), such as any of the PostScript® fonts available from Adobe Systems Incorporated of San Jose, Calif., generally includes instructions (normally read and interpreted by rendering programs executing on computer processors) for rendering characters in a particular typeface. A digital font stores outlines and "hints" of characters along with the font's so-called "font metrics", which relate to the spacing of characters in order to form words of text. Digital font formats are described in detail in the literature. See, for example, Peter Karow, Digital Typefaces, Springer Verlag, 1994, ISBN 3-540-56509-4, pages 139 et seq. As used here, the term "character" refers to any form of character, number, symbol, icon, graphic, or the like that can be output as a graphical element.

The appearance of a typeface is affected not only by the appearance of individual characters, but also by the way the characters are spaced within a character string. See, for example, Peter Karow, Font Technology, Springer Verlag, 1994, ISBN 3-540-57223-6, pages 173 et seq. Accordingly, fonts that support proportional spacing often include spacing metrics providing instructions for defining the spaces between characters.

Furthermore, text processing software may supply "tracking", which provides a constant small amount of additional space between the characters in text output. If a positive or negative tracking value is chosen, that amount is applied no matter what the character pairs are or the pointsize is. Tracking does not take in account that different character pairs require different amounts of additional spacing.

Spacing metrics for enabling proportional spacing are typically generated for output at a specific pointsize, traditionally 12 points, and if an application calls for output at a different pointsize, the spacing is simply scaled linearly. This will be referred to as "traditional" spacing. Unfortunately, linear scaling based on spacing metrics for a single reference pointsize does not produce consistently good results. This is because proper spacing between a character pair can vary with different typefaces, different pairs of characters, and different pointsizes. In general, for clear output, characters at smaller pointsizes require proportionally larger intercharacter spaces than do characters at larger pointsizes.

Existing techniques for spacing each character pair based on the specific characteristics of that character pair are costly to use. One method, termed "automatic kerning", calculates spacing between specific character pairs at output pointsizes on demand, within an application program like Adobe PageMaker. Traditionally, "kerning" refers to a technique of adjusting the spacing of only specific character pairs (called "critical character pairs") based on the shapes of the character strokes. Automatic kerning recognizes that all pairs are critical character pairs and have special spacing requirements, and also recognizes that wider spacing is generally required for characters output at smaller pointsizes, whereas narrower spacing is generally required for characters output at larger pointsizes. Automatic kerning is explained in greater detail in commonly assigned European Patent EP 0 465 704 B1, which discloses a method for automatically generating, for a font at a pointsize, kerning values for a set of critical character pairs and sidebearing values for all characters of the font.

However, automatic kerning requires analysis of the specific font, the specific pointsize, and the specific character combination each time it is applied. Accordingly, it often requires more processing time and power than is reasonably available.

SUMMARY OF THE INVENTION

In general, in one aspect, the invention features methods and apparatus for justifying text to a margin. The method includes the steps of obtaining a kerning value for a character pair consisting of a space character and a non-space character; and positioning the nonspace character at the margin according to the kerning value.

Among the advantages of the invention are the following. The invention provides pointsize-variable kerning of characters against the space character to provide visually attractive alignment of justified text to a margin to create what will be called the "optical margin". The invention also provides pointsize-variable kerning for characters against the space character to provide visually pleasing alignment of justified text to left and right optical margins. The invention may be applied over tracking. The invention may be used with existing digital fonts. The invention may be implemented to achieve its advantages at very little cost in execution time.

For a fuller understanding of the nature and further advantages of the invention, reference should be made to the detailed description taken in conjunction with the accompanying drawings.

BRIEF DESCRIPTION OF THE DRAWINGS

FIG. 1 is a diagram illustrating apparatus suitable for the present invention.

FIG. 2 illustrates spacing metrics that may be used in the invention.

FIG. 3 illustrates an application of negative kerning.

FIG. 4a and FIG. 4b illustrate spacing of character pairs.

FIG. 5a and FIG. 5b compare the appearance of spacing generated by a method of the invention with conventional spacing at three pointsizes.

FIG. 6 is a diagram illustrating elements of a font of the present invention.

FIG. 7 (which consists of FIGS. 7a, 7b, 7c, and 7d) illustrates the results of applying the invention to four character pairs at a range of pointsizes in a Helvetica typeface.

FIG. 8 (which consists of FIGS. 8a, 8b, 8c, and 8d) illustrates the results of applying the invention to four character pairs at a range of pointsizes in a Times Roman typeface.

DETAILED DESCRIPTION

Referring to FIG. 1, an apparatus suitable for implementing a method for pointsize-variable spacing of characters for output includes a computer processor 20, such as an integrated circuit microprocessor, and a memory 22, such as semiconductor RAM or ROM, for storing instructions and data executed and used by the processor 20. The processor 20 running under control of a program 24 in the memory 22 has access to a font 26 that is stored in a machine-readable form in the memory 22 or on a separate storage device 28 such as a hard disk drive or a removable diskette. The font includes a set of instructions that may be rendered by a program 24 running on by the processor 20, which is coupled, directly or indirectly, to an output generating device 30, such as a display screen, laser printer print engine, photo typesetter, or laser film recorder. The processor 20 and memory 22 may be embedded in a peripheral device, such as a PostScript laser printer. Because it includes a set of instructions, the font itself is also a computer program.

The methods described here may be readily implemented in hardware, firmware, or equivalents such as application-specific integrated circuits (ASICs), or in a computer program product tangibly embodied in a computer program storage device for execution by a computer processor. Storage devices suitable for tangibly embodying computer program instructions implementing the methods described here include all forms of nonvolatile memory, including semiconductor memory devices, such as EPROM, EEPROM, and flash memory devices, magnetic disks such as internal hard disks and removable disks, magneto-optical disks, and CD-ROM disks.

Referring to FIG. 2, total width 36 and left and right sidebearings 32 and 34 are traditional parameters (values) that are defined for the characters of a font and stored as font metrics. Traditionally, these values are defined for only one pointsize and are optimized for that pointsize, which is generally 12 points (pt).

When only sidebearings are used, some character pairs get spacing that is too wide, while others get spacing that is too narrow. To correct this, kerning tables are employed, which have correction values for critical character pairs. Generally, use of kerning tables results in a gap between two characters is smaller than would result from only using the characters' constant sidebearings. FIG. 3 illustrates the application of negative kerning—kerning that subtracts distance between characters—applied to the character pair 'AV' (negative kerning distance 38) and the character pair 'Vo' (negative kerning distance 39).

Digital fonts generally have a single kerning table that may contain 200 to 600 kerning values for selected character pairs optimized for one pointsize. This is not enough to provide correct spacing for all pointsizes.

Referring to FIG. 4a and FIG. 4b, the considerations involved in applying the method of pointsize-variable spacing may be described with reference to four illustrative character pairs: HH, OO, AV, and VV. These four pairs have two vertical strokes (HH), two opposite round strokes (OO), two parallel diagonal strokes (AV), and two opposite diagonal strokes (VV) forming the boundaries of their respective character interspaces. These character interspaces should behave differently when the pointsize for writing is changing from small to large, in order to achieve a harmonious appearance at all pointsizes, as is illustrated by the figures.

FIG. 4a shows the four character pairs with traditional spacing at the three pointsizes of 6 pt, 12 pt, and 72 pt. For comparison, FIG. 4b shows the same character pairs with pointsize-variable spacing at the same pointsizes. As is apparent from the figures, all four pairs are well spaced in FIG. 4b, while in FIG. 4a some pairs are spaced too far apart, and some, too close together. In particular, FIG. 4a and FIG. 4b show the following:

- HH is wider at lower, and narrower at larger, pointsizes. The white character interspace has the form of a rectangle. HH usually has no kerning value assigned.
- OO is also wider at lower, and narrower at larger, pointsizes, but in total OO is spaced narrower with respect to the character widths than HH because the two opposite round stems leave more white space at the top and at the bottom. The white character interspace has the form of an hourglass. OO usually has no kerning value assigned; spacing is achieved by the left and right sidebearings only.
- AV always needs to be kerned negatively. The separation could be narrower at larger pointsizes, depending on the style of the typeface. The shape of the white character interspace is a parallelogram.
- VV needs to be kerned positively at lower pointsizes. Above 72 pt, the separation gets relatively narrower. The shape of the white character interspace is a triangle.

These examples show four different forms as character interspace: rectangle, hourglass, parallelogram, and triangle. Following the typographer's rule—the more even the color of a page of text, the more easily it can be read—one would give the same area to all different character interspaces. This is not literally possible or desirable, as will now be described.

The rectangle between HH is taken as the normalizing area for the purpose of the following comparisons. If that area is adopted for VV, the area of the triangle would be too small and cause the letters to overlap. In contrast, AV would look too narrow because human readers are accustomed to see this pair with a relative large white character interspace. Similarly, OO would look too narrow if the hourglass area were normalized in size to the HH rectangle. As with the pair VV, one has to keep a certain minimum separation between the two Os. Also, it seems that the white areas of the hourglass at the top and at the bottom do not contribute their mathematical share to the perceived white interspace. Consideration of just these few examples makes it clear that correct kerned spacing is also based on optical impression and perception, and not only on mathematical equations normalizing the areas of interspaces.

Referring to FIG. 6, a font 26 to be used in the method of pointsize-variable spacing includes, in addition to the character rendering instructions, hints, and tables normally found in a font, at least one additional set of spacing metrics. The embodiment to be described uses a font with three kerning tables 50, designated K6, K12, and K72, and three sets of sidebearings 52, designated L6 and R6, L12 and R12, and L72 and R72. These metrics are especially spaced, kerned and generated for reference pointsizes of 6 pt, 12 pt, and 72 pt, respectively. Equivalently, the multiple spacing metrics, including the multiple kerning values and the multiple sidebearing values, are kept in one or more multivalued tables or other data structures.

The term "spacing metrics" is used here to encompass parameters describing the character spacing for a font. The specific parameters and the format in which they are represented may vary. The values for the spacing metrics parameters may be determined by any suitable method. For example, the kerning values for character pairs at a reference pointsize may be determined by hand or by the automatic kerning method described above. Further, the spacing metrics values may be represented in various formats without affecting the application of the method of pointsize-variable spacing.

As is conventional, spacing and other font metrics are given in so-called "units". A unit is one-1000th of a point, or about one-72000th of an inch. In one embodiment, the metric sets for 12 pt (K12, L12, and R12) contain absolute spacing values in units, whereas the sets for 6 pt and 72 pt contain spacing values expressed as differences from the 12 pt values. The kerning values expand the intercharacter space (if positive) or contract it (if negative). Differences are used for reasons of convenience and for speed in the calculations that will be described.

The spacing metrics (including kerning and sidebearing values) may be generated automatically by applying the automatic kerning method of the patent cited above (EP 0 465 704 B1) to the font multiple times—once for each of the pointsizes 6 pt, 12 pt, and 72 pt, for example. Alternatively, the metrics may be generated by hand, or generated automatically and then fine-tuned by hand.

In one embodiment, the spacing metrics include kerning values for characters paired with the space character. Use of such space-kerning values is advantageous in spacing words and in achieving visually pleasing margins for justified text. For example, at a justified left margin one can kern the first character of the line of text against a space character to place the character so as to achieve an optical margin. Without kerning, or with a kerning value of zero, the left edge of the total width of the text character is placed on the left margin. If the kerning value is negative, the character is shifted to the left; if positive, it is shifted to the right. Similarly, the last character of a line may be kerned against a space character to place the text character properly at a justified right margin. At a right margin, a negative kerning value shifts the last text character to the right and a positive value shifts it to the left.

The embodiment of the method of pointsize-variable spacing that will be described interpolates to the specified output pointsize based on two sets of spacing metrics: the set for pointsize 12 pt, and one of the sets for pointsize 6 pt or 72 pt, whichever is on the same side of 12 pt as the output pointsize is on. For example, spacing for a character pair at an output pointsize of 9 pt is interpolated from the spacing metrics for pointsizes 6 pt and 12 pt.

Various methods of interpolation may be used, and selection of a specific method may depend on the requirements of the application, as well as other variables including the typeface, the format of the sets of spacing metrics, the processing power available for generating output, or the processing time requirements. In the following paragraphs, a simple and sufficient linear interpolation method will be described.

As has been mentioned, three sets of right sidebearing values are referred to as R6, R12, and R72; three sets of left sidebearing values are referred to as L6, L12, and L72; and three sets of kerning values are referred to as K6, K12, and K72. For an output pointsize of X, spacing metrics values referred to as RX, LX, and KX are calculated, and the spacing for a specific character pair $C_1C_2$ is calculated as the sum $$RX(C_1)+LX(C_2)+KX(C_1C_2).$$

For an output pointsize X, which need not be an integer, an interpolation factor F is calculated by applying the following rules.

For: $X \leq 6$, $F=1$ (1)

$6<X<12$, $F=(12-X)/6$ $12 \leq X<72$, $F=(X-12)/60$ $72<X$, $F=1$

Alternatively, the interpolation may be extended so that the factor F for pointsizes less than 6 pt is greater than 1 and the factor F for pointsizes greater than 72 pt is greater than 1.

Interpolation factor F may either be calculated as needed during execution of an application, or interpolation factors may be precalculated for a range of output pointsizes and stored in a lookup table. In either case, for linear interpolation, once interpolation value F is determined, values for RX, LX, and KX are calculated by linear interpolation from two sets of spacing metrics. The following equations (2) provide a linear interpolation for output pointsizes between 6 pt and 12 pt or between 12 pt and 72 pt, with a linear or constant extrapolation for pointsizes less than 6 pt or greater than 72 pt. In these equations, variables RY, LY, and KY refer to the outside set of spacing metrics: R6, L6, and K6 if X<12; or R72, L72, and K72 if X>12. (F=0 if X=12.)

$RX=R12+F \times RY$ $LX=L12+F \times LY$ $KX=K12+F \times KY$ (2)

The range of reasonably likely output pointsizes runs from 4 pt (very hard to read) to 200 pt (poster type, very rarely used), but a common working range is from 8 pt to 24 pt. The three pointsizes (6 pt, 12 pt, and 72 pt) were chosen as optimal in terms of storage requirements and placement for interpolation for this common range. Other choices for the pointsizes and/or a different number of pointsizes could be used for interpolation, as could other, nonlinear, interpolation methods.

The sidebearing values (L6, L12, and so on) are conventionally stored in a table (array) and addressed by character number, that is, by the internal representation of a letter or other character in a digital alphabet, which normally has on the order of 300 characters. Normally, a kerning table stored on a disk or transmitted with a document, as part of font, for example, would be expected to have values for only about 3000 critical character pairs (3000×2=6 K bytes), so that any of various techniques may be used to reduce the required disk storage or data transmission time at the cost of some extra processing. In one such technique, a set of kerning classes is defined and stored in a table or other suitable data structure to indicate when accented characters inherit the kerning values from their base characters, thereby reducing the number of character pairs that need to be stored. For example, in defining a class kerning table it would be recognized that the kerning for the pairs ÂT, ÄT, ÅT, ÁT, and ÀT is the same as for the pair AT, while the kerning for Te is not the same as for Tè, Té, Tê, or Të.

The kerning values (K6 and so on) can be stored at run time as an expanded matrix addressed by a pair of character numbers, which for an alphabet of 300 characters would require an allocation of 300×300×2 (about 200K) bytes of storage, which is reasonable in a modern personal computer. In one alternative embodiment, the run-time matrix is sized to be addressable by all pairs of characters in the alphabet. In this embodiment, the matrix value for a character pair may be a kerning value or, alternatively, the sum of a right sidebearing for the first character of the pair, a kerning value, and a left sidebearing for the second character of the pair (assuming the characters are written left to right). If such composite spacing metrics are stored in matrices for pointsizes of 6 pt, 12 pt, and 72 pt, for example, the calculations described below can be simplified accordingly.

The following example will illustrate spacing of the character pairs AV and VV at output pointsizes X1=6, X2=9, X3=12, X4=42, and X5=72. The spacing metrics values for the characters A and V are:

| A: | R6 = 5 | V: | R6 = 5 |
|---|---|---|---|
|  | R12 = 0 |  | R12 = 0 |
|  | R72 = −3 |  | R72 = −3 |
|  | L6 = 5 |  | L6 = 5 |
|  | L12 = 0 |  | L12 = 0 |
|  | L72 = −3 |  | L72 = −3 |
| AV: | K6 = 10 | VV: | K6 = 3 |
|  | K12 = −80 |  | K12 = 5 |
|  | K72 = −10 |  | K72 = −10 |

First, interpolation factors F are calculated in accordance with the equations (1), above: FX1=1; FX2=0.5; FX3=0; FX4=0.5; and FX5=1.

Next, for character pair AV, RX is determined for A, LX is determined for V, and KX is determined for AV, in accordance with equation (2), based on the spacing metrics given above:

X1:
   RX1(A)=R12(A)+FX1×R6(A)=0+5=5
   LX1(V)=L12(V)+FX1×L6(V)=0+5=5
   KX1(AV)=K12(AV)+FX1×K6(AV)=−80+10=−70
   Total spacing=RX1(A)+LX1(V)+KX1(AV)=−60

X2:
   RX2(A)=R12+FX2×R6=0+0.5×5=2.5
   LX2(V)=L12+FX2×L6=0+0.5×5=2.5
   KX2(AV)=K12+FX2×K6=−80+0.5×10=−75
   Total spacing=RX2(A)+LX2(V)+KX2(AV)=−70

Similarly, for X3 the total spacing is −80; for X4 the total spacing is −88; and for X5 the total spacing is −96.

Carrying out the same calculations for a second example with the same output pointsizes X1 through X5 for the character pair VV, KX is determined for VV, and RX and LX are determined for V. Accordingly, for X1 the total spacing is 18; for X2 the total spacing is 11.5; for X3 the total spacing is 5; for X4 the total spacing is −3; and for X5 the total spacing is −11.

Review of the total spacing results for the character pairs AV and VV shows how spacings for character pairs are computed taking into consideration both the specific characters as well as the output pointsize. By interpolating from two sets of spacing metrics, the method computes spacings that are more accurate than could be calculated by simply scaling spacings derived from a single set of spacing metrics.

Referring to FIG. 7 and FIG. 8, spacings derived from the above-described embodiment of the method of pointsize-variable character spacing are compared with spacings derived from a number of hand-tuned sets of left and right sidebearing values and kerning values. In each of these figures, the spacing (vertical axis) is plotted against pointsize (horizontal axis). Spacing is normalized to units of one-1000th of the character body size. Character pointsize is in points. The generally horizontal plot line, labeled "traditional", shows the traditional spacing generated by using 12 pt spacing scaled linearly to the larger and smaller pointsizes. The plot line labeled "hand tuned" shows the results of hand-tuned spacing over a range of pointsizes, while the plot line labeled "invented method" shows the spacing generated by the present method of pointsize-variable character spacing. FIG. 7 shows spacings for the Helvetica typeface. FIG. 8 shows spacings for the Times Roman typeface. FIGS. 7*a* and 8*a* show the separations of HH as a function of the pointsize. Similarly, FIGS. 7*b* and 8*b* show the separations of OO; FIGS. 7*c* and 8*c* show the separations of AV; and FIGS. 7*d* and 8*d* show the separations of VV. These exemplary results for the character pairs HH, OO, AV, and VV show that use of three pointsize values gives a good approximation to hand-tuned spacing.

Although the present invention has been described in terms of a specific embodiment, the invention is not limited to this specific embodiment. For example, the interpolation may be applied to spacing metrics parameters other than kerning and sidebearings, such as, for example, optical margins, without diminishing the advantages of the present invention. Other forms of interpolation, such as nonlinear interpolations (within a range of 6 pt to 72 pt, for example) and nonlinear extrapolations (for example, below 6 pt or above 72 pt) may also be employed. (As used here, the term interpolation encompasses calculations that would strictly be termed extrapolations, unless context requires otherwise.) Also, interpolation may be limited only to sidebearing values, or only to kerning values, rather than being applied both to sidebearing values and to kerning values.

What is claimed is:

1. A method for justifying a line of text to a margin, the line of text having a nonspace character at the margin, the method comprising:

obtaining a first kerning value for a character pair consisting of a space character and the nonspace character; and positioning the nonspace character at the margin according to the first kerning value.

2. A method for justifying a line of text to a left margin and a right margin, the line of text having a left-most text character and a right-most text character, the method comprising:

obtaining a first kerning value for a first character pair consisting of a space character followed by the left-most text character, and a second kerning value for a second character pair consisting of the right-most text character followed by a space character;

positioning the left-most text character at the left margin according to the first kerning value; and positioning the right-most text character at the right margin according to the second kerning value.

3. The method of claim 2 for justifying the line of text for output at an output pointsize, wherein:

the first kerning value is obtained by interpolating first kerning metrics for a small pointsize and first kerning metrics for a different large pointsize; and the small pointsize is not greater than the output pointsize and the large pointsize is not less than the output pointsize.

4. The method of claim 3, where the small pointsize is not greater than 12 points and the large pointsize is not less than 12 points.

5. The method of claim 3, further comprising:

obtaining the first kerning metrics for at least three pointsizes;

selecting one of the at least three pointsizes as the small pointsize; and selecting a different one of the at least three pointsizes as the large pointsize.

6. The method of claim 5, where the first kerning metrics include pointsizes of 6 points, 12 points, and 72 points.

7. The method of claim 3, where the step of interpolating includes calculating a linear interpolation of the small pointsize and the large pointsize first kerning metrics.

8. A computer program on a computer-readable medium for justifying a line of text to a first margin, the line of text having a first nonspace character at the first margin, the program comprising instructions to:

obtain a first kerning value for a first character pair consisting of a space character and the first nonspace character; and position the first nonspace character at the first margin according to the first kerning value.

9. The computer program of claim 8 for additionally justifying the line of text to a second margin, the line of text having a second nonspace character at the second margin, the program further comprising instructions to:

obtain a second kerning value for a second character pair including the space character and the second nonspace character; and position the second nonspace character at the second margin according to the second kerning value.

10. The computer program of claim 9 for justifying the line of text for output at an output pointsize, wherein:

the first kerning value is obtained by interpolating first kerning metrics for a small pointsize and first kerning metrics for a different large pointsize; and the small pointsize is not greater than the output pointsize and the large pointsize is not less than the output pointsize.

11. The computer program on the computer-readable medium of claim 10, where the small pointsize is not greater than 12 points and the large pointsize is not less than 12 points.

12. The computer program on the computer-readable medium of claim 10, further comprising the instructions to:

obtain the first kerning metrics for at least three pointsizes;

select one of the at least three pointsizes as the small pointsize; and select a different one of the at least three pointsizes as the large pointsize.

13. The computer program on the computer-readable media of claim 12, where the first kerning metrics include pointsizes of 6 points, 12 points, and 72 points.

14. The computer program on the computer-readable medium of claim 9, where the step of interpolating includes calculating a linear interpolation of the small pointsize and the large pointsize first kerning metrics.

* * * * *